(12) United States Patent
Cutright et al.

(10) Patent No.: US 8,158,289 B2
(45) Date of Patent: Apr. 17, 2012

(54) INTEGRATED HIGH TEMPERATURE PEM FUEL CELL SYSTEM

(76) Inventors: Richard H. Cutright, Corinth, NY (US); Wayne W. Huang, Latham, NY (US); Jeffrey E. Ingraham, Albany, NY (US); Kerry J. Jameson, Saratoga Spgs., NY (US)

(*) Notice: Subject to any disclaimer, the term of this patent is extended or adjusted under 35 U.S.C. 154(b) by 0 days.

(21) Appl. No.: 11/299,862

(22) Filed: Dec. 12, 2005

(65) Prior Publication Data

US 2006/0099467 A1    May 11, 2006

Related U.S. Application Data

(63) Continuation of application No. 10/121,189, filed on Apr. 12, 2002, now abandoned.

(60) Provisional application No. 60/287,207, filed on Apr. 27, 2001.

(51) Int. Cl.
*H01M 8/04* (2006.01)
*H01M 8/06* (2006.01)
*H01M 8/10* (2006.01)

(52) U.S. Cl. ......... 429/414; 429/425; 429/440; 429/492

(58) Field of Classification Search .................. None
See application file for complete search history.

(56) References Cited

U.S. PATENT DOCUMENTS

| | | | | |
|---|---|---|---|---|
| 3,976,507 A | * | 8/1976 | Bloomfield | 429/17 |
| 6,117,577 A | * | 9/2000 | Wilson | 429/17 |
| 6,465,136 B1 | * | 10/2002 | Fenton et al. | 429/309 |
| 6,485,853 B1 | * | 11/2002 | Pettit et al. | 429/17 |
| 6,492,044 B1 | * | 12/2002 | Walsh | 429/13 |
| 6,551,732 B1 | * | 4/2003 | Xu | 429/17 |
| 6,686,078 B1 | * | 2/2004 | Jones | 429/17 |
| 6,753,107 B2 | | 6/2004 | Huang | 429/17 |
| 2006/0051628 A1 | * | 3/2006 | Lim et al. | 429/13 |

OTHER PUBLICATIONS

Geankoplis, C. J., Transport Processes and Unit Operations, $3^{rd}$ Edition, Prentice-Hall Inc., 1993, pp. 133-139.*
U.S. Appl. No. 10/838,559, entitled "Integrated Fuel Cell System," filed May 4, 2004.

* cited by examiner

*Primary Examiner* — Jonathan Crepeau
(74) *Attorney, Agent, or Firm* — Heslin Rothenberg Farley & Mesiti P.C.; Victor A. Cardona

(57) ABSTRACT

A fuel cell system includes a fuel cell stack that includes PEM fuel cells. Each fuel cell has an operating temperature of at least 120° C. The fuel cell stack has a cathode inlet to receive a flow of ambient air and a cathode outlet to provide a cathode exhaust flow. The fuel cell system includes a fuel processing reactor that has inlet and an outlet. The inlet and outlet are in fluid communication with a catalyst that is suitable for convening a hydrocarbon into a gas that contains hydrogen and carbon monoxide. The outlet is in fluid communication with an anode chamber of the fuel cell, and the inlet of the fuel processing reactor is in fluid communication with the cathode outlet.

3 Claims, 6 Drawing Sheets

INTEGRATED HIGH TEMPERATURE PEM FUEL CELL SYSTEM

CROSS REFERENCE TO RELATED APPLICATIONS

This application is a continuation of U.S. patent application Ser. No. 10/121,189, entitled INTEGRATED HIGH TEMPERATURE PEM FUEL CELL SYSTEM," filed on Apr. 12, 2002, now abandoned which claims priority to U.S. Provisional Application No. 60/287,207, filed Apr. 27, 2001, entitled "INTEGRATED HIGH TEMPERATURE PEM FUEL CELL SYSTEM." Each of application Ser. Nos. 10/121,189 and 60/287,207 is incorporated herein by reference in its entirety.

GOVERNMENT INTEREST

The Government of the United States of America has rights in this invention pursuant to Contract No. NIST-70NAN8H4039 awarded by the U.S. Department of Commerce, National Institute of Standards and Technology.

BACKGROUND

The invention generally relates to an integrated high temperature PEM fuel cell system.

A fuel cell is an electrochemical device that converts chemical energy produced by a reaction directly into electrical energy. For example, one type of fuel cell includes a polymer electrolyte membrane (PEM), often called a proton exchange membrane, that permits only protons to pass between an anode and a cathode of the fuel cell. At the anode, diatomic hydrogen (a fuel) is reacted to produce protons that pass through the PEM. The electrons produced by this reaction travel through circuitry that is external to the fuel cell to form an electrical current. At the cathode, oxygen is reduced and reacts with the protons to form water. The anodic and cathodic reactions are described by the following equations:

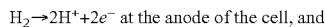

$H_2 \rightarrow 2H^+ + 2e^-$ at the anode of the cell, and

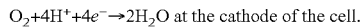

$O_2 + 4H^+ + 4e^- \rightarrow 2H_2O$ at the cathode of the cell.

A typical fuel cell has a terminal voltage of up to one volt DC. For purposes of producing much larger voltages, several fuel cells may be assembled together to form an arrangement called a fuel cell stack, an arrangement in which the fuel cells are electrically coupled together in series to form a larger DC voltage (a voltage near 100 volts DC, for example) and to provide more power.

The fuel cell stack may include flow plates (graphite composite or metal plates, as examples) that are stacked one on top of the other. The plates may include various surface flow channels and orifices to, as examples, route the reactants and products through the fuel cell stack. Several PEMs (each one being associated with a particular fuel cell) may be dispersed throughout the stack between the anodes and cathodes of the different fuel cells. Electrically conductive gas diffusion layers (GDLs) may be located on each side of each PEM to act as a gas diffusion media and in some cases to provide a support for the fuel cell catalysts. In this manner, reactant gases from each side of the PEM may pass along the flow channels and diffuse through the GDLs to reach the PEM. The PEM and its adjacent pair are often assembled together in an arrangement called a membrane electrode assembly (MEA).

A fuel cell system may include a fuel processor that converts a hydrocarbon (natural gas or propane, as examples) into a fuel flow for the fuel cell stack. Exemplary fuel processor systems are described in U.S. Pat. Nos. 6,207,122, 6,190,623, 6,132,689, which are hereby incorporated by reference.

The two reactions which are generally used to convert a hydrocarbon fuel into hydrogen are shown in equations (3) and (4).

$$\tfrac{1}{2}O_2 + CH_4 \longrightarrow 2H_2 + CO \tag{3}$$

$$H_2O + CH_4 \longrightarrow 3H_2 + CO \tag{4}$$

The reaction shown in equation (3) is sometimes referred to as catalytic partial oxidation (CPO). The reaction shown in equation (4) is generally referred to as steam reforming. Both reactions may be conducted at a temperature from about 600-1,100° C. in the presence of a catalyst such as platinum. A fuel processor may use either of these reactions separately, or both in combination. While the CPO reaction is exothermic, the steam reforming reaction is endothermic. Reactors utilizing both reactions to maintain a relative heat balance are sometimes referred to as autothermal (ATR) reactors. It should be noted that fuel processors are sometimes generically referred to as reformers, and the fuel processor output gas is sometimes generically referred to as reformate, without respect to which reaction is employed.

As evident from equations (3) and (4), both reactions produce carbon monoxide (CO). Such CO is generally present in amounts greater than 10,000 parts per million (ppm). Because of the high temperature at which the fuel processor is operated, this CO generally does not affect the catalysts in the fuel processor. However, if this reformate is passed to a prior art fuel cell system operating at a lower temperature (e.g., less than 100° C.), the CO may poison the catalysts in the fuel cell by binding to catalyst sites, inhibiting the hydrogen in the cell from reacting. In such systems it is typically necessary to reduce CO levels to less than 100 ppm to avoid damaging the fuel cell catalyst. For this reason the fuel processor may employ additional reactions and processes to reduce the CO that is produced. For example, two additional reactions that may be used to accomplish this objective are shown in equations (5) and (6). The reaction shown in equation (5) is generally referred to as the shift reaction, and the reaction shown in equation (6) is generally referred to as preferential oxidation (PROX).

$$CO + H_2O \longrightarrow H_2 + CO_2 \tag{5}$$

$$CO + \tfrac{1}{2} \longrightarrow CO_2 \tag{6}$$

Various catalysts and operating conditions are known for accomplishing the shift reaction. For example, the reaction may be conducted at a temperature from about 300-600° C. in the presence of supported platinum. Other catalysts and operating conditions are also known. Such systems operating in this temperature range are typically referred to as high temperature shift (HTS) systems. The shift reaction may also be conducted at lower temperatures such as 100-300° C. in the presence of other catalysts such as copper supported on transition metal oxides. Such systems operating in this temperature range are typically referred to as low temperature shift (LTS) systems. Other catalysts and operating conditions are also known. In a practical sense, typically the shift reaction may be used to lower CO levels to about 1,000-10,000 ppm, although as an equilibrium reaction it may be theoretically possible to drive CO levels even lower.

The PROX reaction may also be used to further reduce CO. The PROX reaction is generally conducted at lower temperatures than the shift reaction, such as 100-200° C. Like the CPO reaction, the PROX reaction can also be conducted in the presence of an oxidation catalyst such as platinum. The PROX reaction can typically achieve CO levels less than 100 ppm (e.g., less than 50 ppm).

In general, fuel cell power output is increased by raising fuel and air flow to the fuel cell in proportion to the stoichiometric ratios dictated by the equations listed above. Thus, a controller of the fuel cell system may monitor the output power of the stack and based on the monitored output power, estimate the fuel and air flows required to satisfy the power demand. In this manner, the controller regulates the fuel processor to produce this flow, and in response to the controller detecting a change in the output power, the controller estimates a new rate of fuel flow and controls the fuel processor accordingly.

The ratio of fuel or air provided to a fuel cell over what is theoretically required by a given power demand is sometimes referred to as "stoich". For example, 1 anode stoich refers to 100% of the hydrogen theoretically required to meet a given power demand, whereas 1.2 stoich refers to 20% excess hydrogen over what is theoretically required. Since in real conditions it is typical that not all of the hydrogen or air supplied to a fuel cell will actually react, it may be desirable to supply excess fuel and air to meet a give power demand.

The fuel cell system may provide power to a load, such as a load that is formed from residential appliances and electrical devices that may be selectively turned on and off to vary the power that is demanded. Thus, in some applications the load may not be constant, but rather the power that is consumed by the load may vary over time and change abruptly. For example, if the fuel cell system provides power to a house, different appliances/electrical devices of the house may be turned on and off at different times to cause the load to vary in a stepwise fashion over time.

There is a continuing need for integrated fuel cell systems designed to achieve objectives including the forgoing in a robust, cost-effective manner.

SUMMARY

In accordance with an embodiment of the invention, a fuel cell system includes a fuel cell stack that includes PEM fuel cells. Each fuel cell has an operating temperature of at least 120° C. The fuel cell stack has a cathode inlet to receive a flow of ambient air and a cathode outlet to provide a cathode exhaust flow. The fuel cell system includes a fuel processing reactor that has an inlet and an outlet. The inlet and outlet are in fluid communication with a catalyst that is suitable for converting a hydrocarbon into a gas that contains hydrogen and carbon monoxide. The outlet is in fluid communication with an anode chamber of the fuel cell, and the inlet of the fuel processing reactor is in fluid communication with the cathode outlet.

Advantages and other features of the invention will become apparent from the following description, drawing and claims.

DETAILED DESCRIPTION

Figures 1, 2:
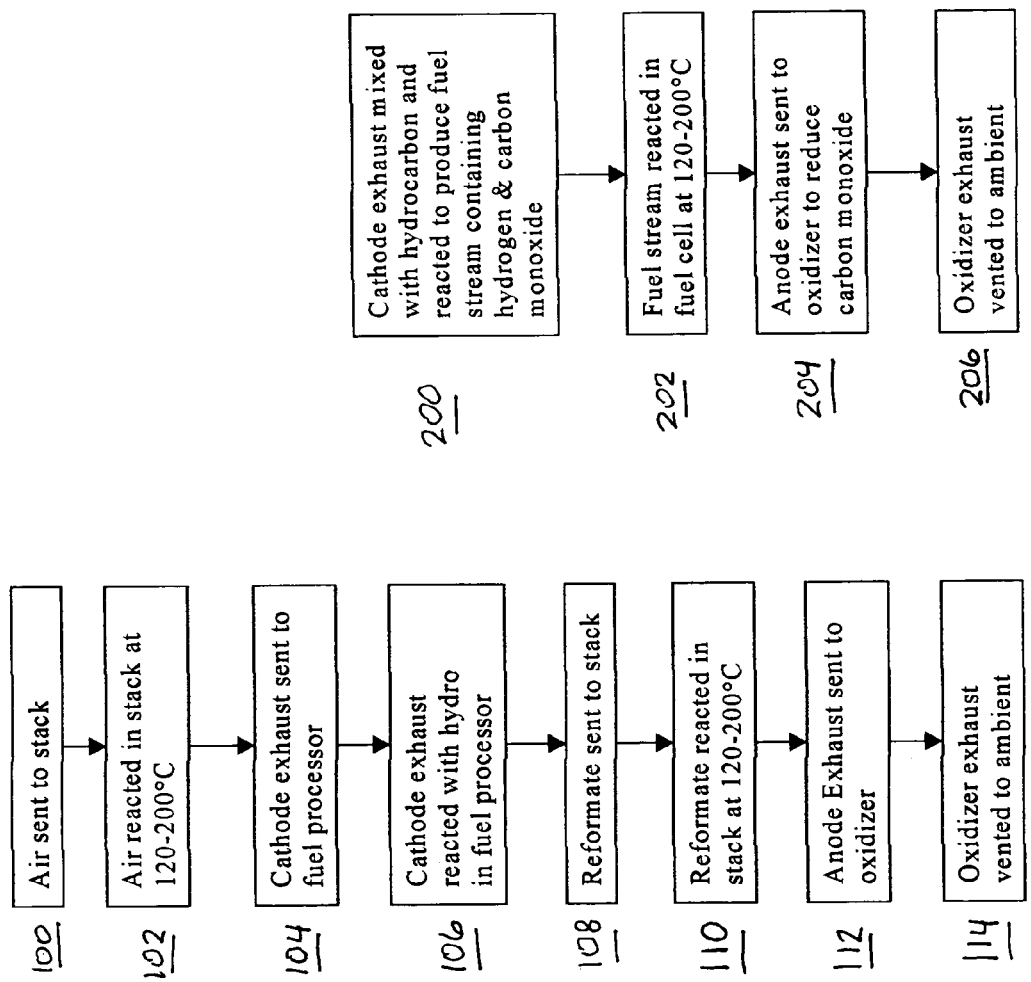
FIG. 1 shows a flow diagram of an integrated high temperature PEM fuel cell system.
FIG. 2 shows a flow diagram of an integrated high temperature PEM fuel cell system.

Referring to FIG. 1, a flow diagram is shown of an integrated high temperature PEM fuel cell system, including the following steps: (100) air is sent to a fuel cell stack; (102) the air is reacted in the stack at a temperature in the range 120-200° C.; (104) cathode exhaust from the fuel cell is sent to a fuel processor; (106) the cathode exhaust is reacted with hydrocarbon in the fuel processor to produce reformate; (108) the reformate is sent to a fuel cell stack; (110) the reformate is reacted in the stack at a temperature in the range 120-200° C.; (112) the anode exhaust from the fuel cell is sent to an oxidizer; and (114) the exhaust from the oxidizer is vented to ambient.

Referring to FIG. 2, another flow diagram is shown of an integrated high temperature PEM fuel cell system; including the following steps: (200) cathode exhaust from a fuel cell is mixed with a hydrocarbon and reacted to produce a fuel stream containing hydrogen and carbon monoxide; (202) the fuel stream is reacted in a fuel cell at a temperature in the range 120-200° C.; (204) the anode exhaust from the fuel cell is sent to an oxidizer to reduce carbon monoxide levels; and (206) the exhaust from the oxidizer is vented to ambient (the atmosphere around the system).

Figure 3:
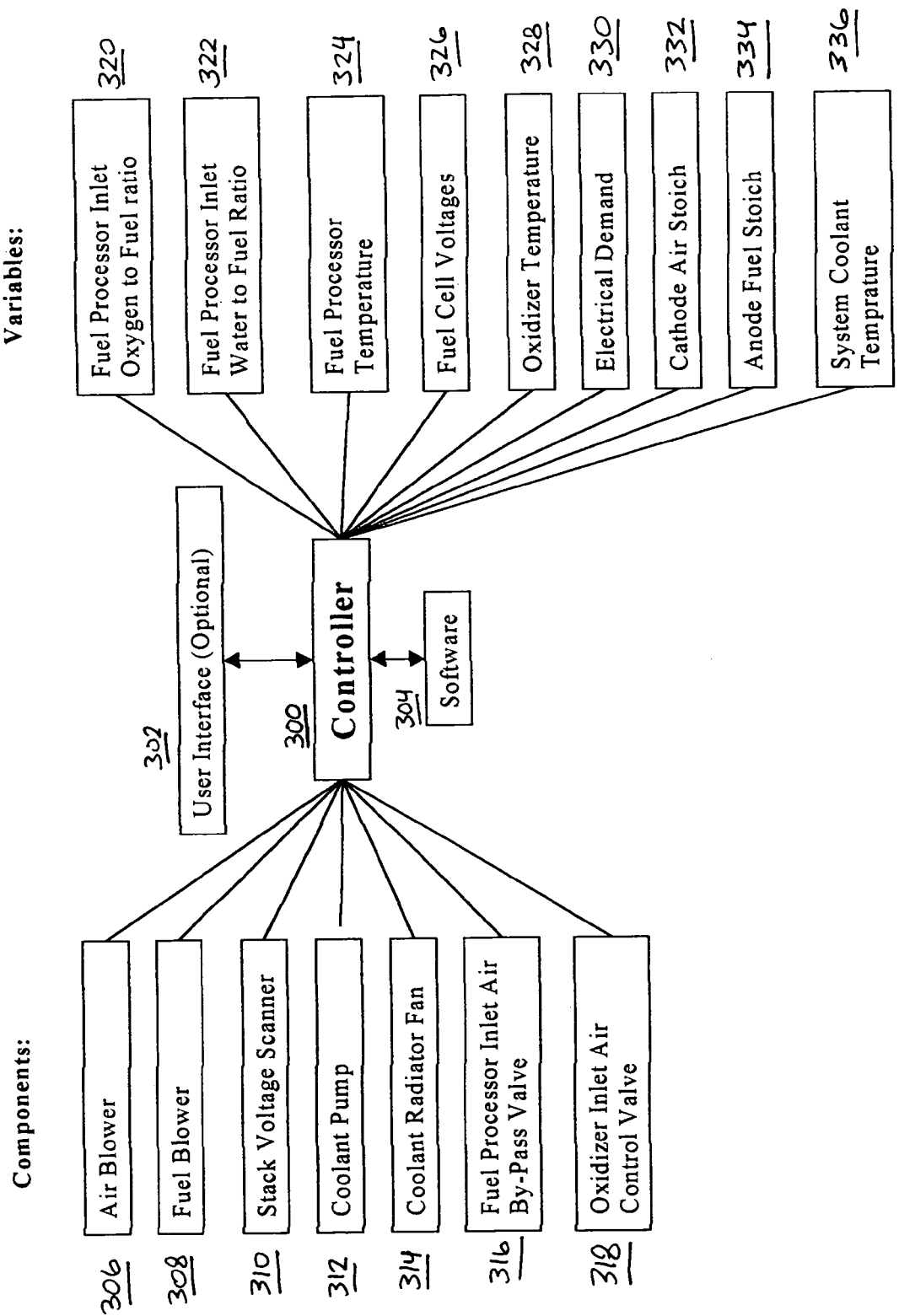
FIG. 3 shows a schematic of a control system for an integrated high temperature PEM fuel cell system.

Referring to FIG. 3, a schematic is shown of a control system for an integrated high temperature PEM fuel cell system. Such a control system can include the following components, as examples: (300) an electronic controller, e.g., a programmable microprocessor; (302) a graphical user interface; (304) software for instructing the controller; (306) an air blower for providing the system with air, e.g., the fuel cell cathode and/or the fuel processor; (308) a fuel blower for driving hydrocarbon into the fuel processor; (310) a stack voltage scanner for measuring the stack voltage and/or the individual voltages of fuel cells within the stack; (312) a coolant pump for circulating a coolant through the fuel cell stack to maintain a desired stack operating temperature; (314) a coolant radiator and fan for expelling heat from the coolant to ambient; (316) a fuel processor inlet air by-pass valve for controlling the amount of air fed to the fuel processor; and (318) an oxidizer inlet air control valve.

Such a control system can operate to control the following variables, as examples: (320) the fuel processor inlet oxygen to fuel ratio; (322) the fuel processor inlet water to fuel ratio; (324) a fuel processor reactor temperature; (326) the voltage of the fuel cell stack or of individual fuel cells within the stack; (328) the oxidizer temperature; (330) electrical demand on the fuel cell system; (332) the cathode air stoich; (334) the anode fuel stoich; and (336) the system coolant temperature.

Figure 4:
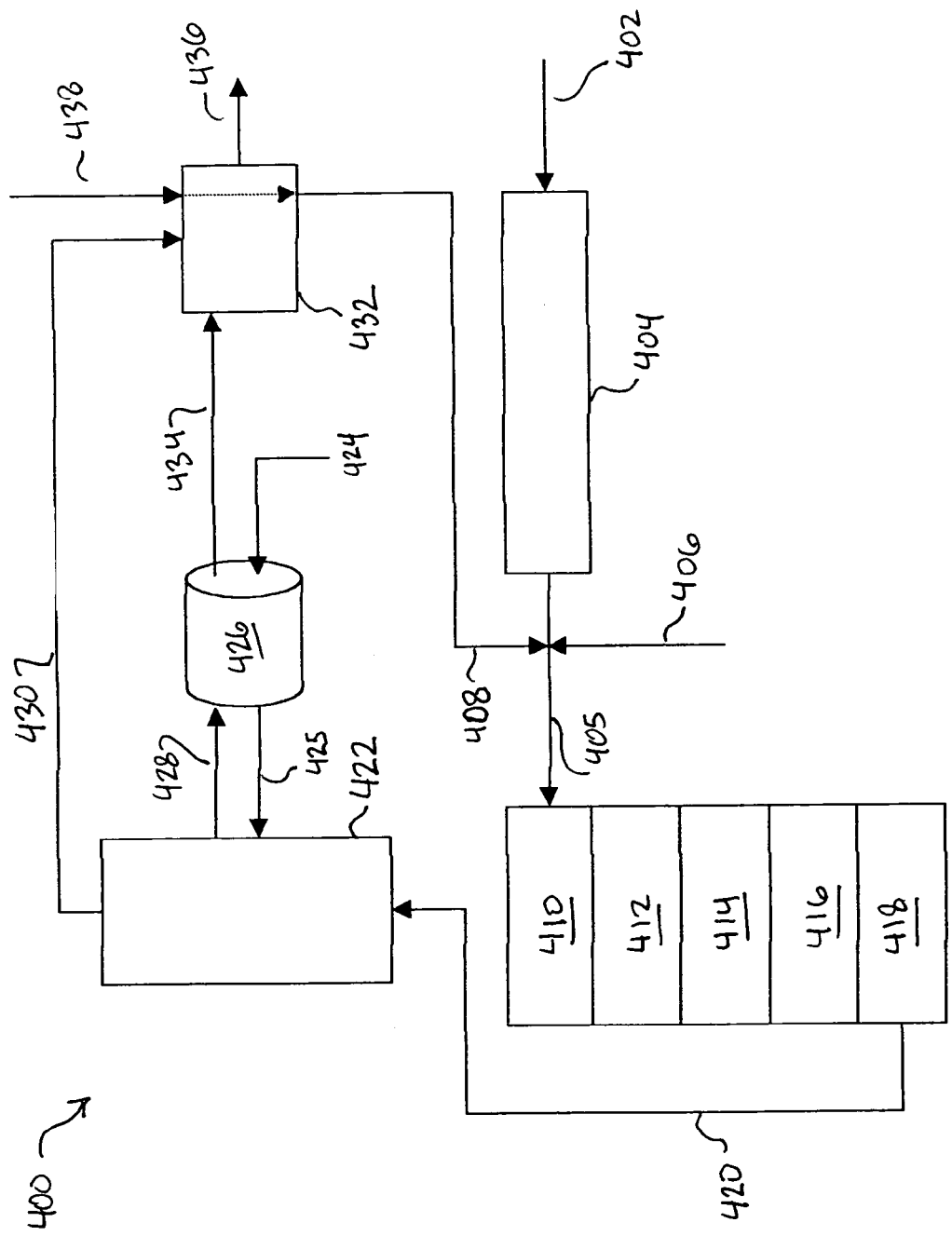
FIG. 4 shows a prior art integrated fuel cell system.

Referring to FIG. 4, a prior art integrated fuel cell system 400 is shown. Natural gas is injected into the system through conduit 402. The natural gas flows through desulfurization vessel 404, which contains a sulfur-adsorbent material such as activated carbon. The de-sufurized natural gas is then flowed to a conversion reactor 410 via conduit 405. Before being reacted in the conversion reactor 410, the de-sulfurized natural gas is mixed with air 406 and steam 408. It will be appreciated that the conversion reactor 410 is an autothermal reactor (see equations 3 and 4). The converted natural gas, referred to as reformate, then flows through a series of high temperature shift reactors 412 and 414 (see equation 5), through a low temperature shift reactor 416, and then through a PROX reactor 418 (see equation 6). It will be appreciated that the primary function of this series of reactors is to maximize hydrogen production while minimizing carbon monoxide levels in the reformate. The reformate is then flowed via conduit 420 to the anode chambers (not shown) of a fuel cell stack 422.

Air enters the system via conduit 424 and through conduit 406 as previously mentioned. In the present example, the fuel cell stack 422 uses sulfonated fluorocarbon polymer PEMs that need to be kept moist during operation to avoid damage. While the reformate 420 tends to be saturated with water, the ambient air 424 tends to be subsaturated. To prevent the ambient air 424 from drying out the fuel cells in stack 422, the air 424 is humidified by passing it through an enthalpy wheel 426, which also serves to preheat the air 424. The theory and operation of enthalpy wheels are described in U.S. Pat. No. 6,013,385, which is hereby incorporated by reference. The air 424 passes through the enthalpy wheel 426 through the cathode chambers (not shown) of the fuel cell stack 422. The air 424 picks up heat and moisture in the stack 422, and is exhausted via conduit 428 back through the enthalpy wheel 426. The enthalpy wheel 426 rotates with respect to the injection points of these flows such that moisture and heat from the cathode exhaust 428 is continually passed to the cathode inlet air 424 prior to that stream entering the fuel cell.

The anode exhaust from the fuel cell is flowed via conduit 430 to an oxidizer 432, sometimes referred to as an "anode tailgas oxidizer". The cathode exhaust leaves the enthalpy wheel 426 via conduit 434 and is also fed to the oxidizer 432 to provide oxygen to promote the oxidation of residual hydrogen and hydrocarbons in the anode exhaust 430. As examples, the oxidizer 432 can be a burner or a catalytic burner (similar to automotive catalytic converters). The exhaust of the oxidizer is vented to ambient via conduit 436. The heat generated in the oxidizer 432 is used to convert a water stream 438 into steam 408 that is used in the system.

Figure 5:
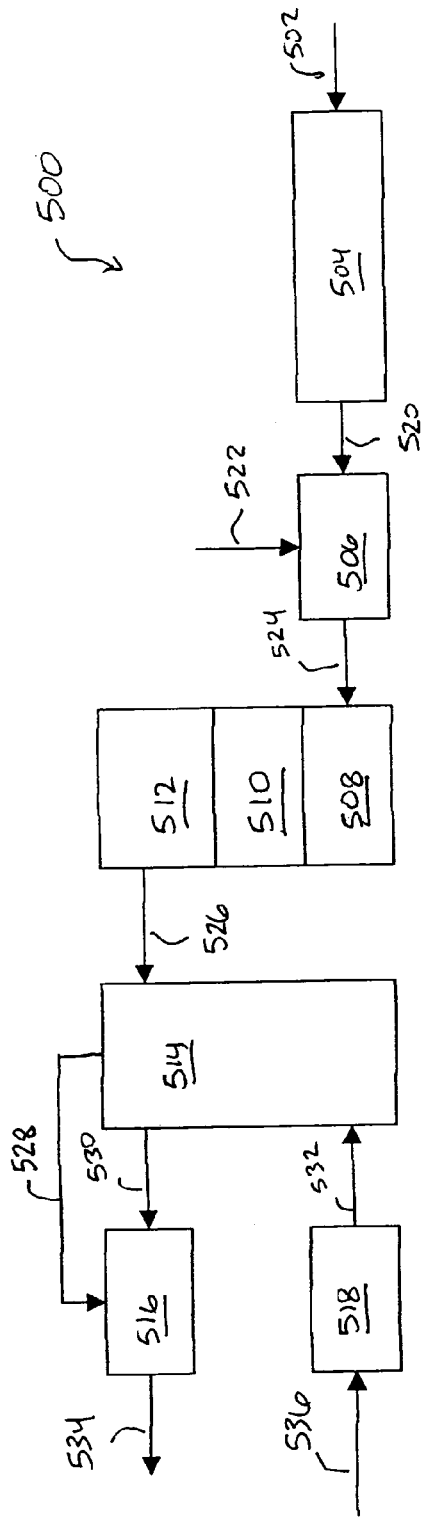
FIG. 5 shows a prior art integrated fuel cell system.

Referring to FIG. 5, another prior art integrated fuel cell system 500 is shown. Natural gas enters the system via conduit 502 and is injected into a de-sulfurization vessel 506 via conduit 520. The de-sulfurized natural gas is then injected into a mixing vessel 506 where is it mixed with air 522 and steam (not shown), and then injected via conduit 524 into an autothermal reactor 508. The reformate is then flowed through a shift reactor 510 and then through a PROX reactor 512, before it is injected via conduit 526 into the anode chambers (not shown) of a fuel cell stack 514. The anode exhaust is flowed via conduit 530 to an oxidizer 516 that is vented to ambient via conduit 534. Air enters the system as previously mentioned via conduit 522, and also via conduit 536 that injects ambient air into a humidifier 518 (e.g., steam humidifier or enthalpy wheel). The humidified air is then injected via conduit 532 into the cathode chambers (not shown) of fuel cell stack 514. The cathode exhaust is flowed via conduit 528 to oxidizer 516.

In some embodiments of the present invention, the cathode exhaust is the sole source of steam utilized in the ATR. This provides an advantageous simplification of systems such as that shown in FIGS. 4 and 5, since the simplified systems under the present invention do not require subsystems to humidify the hydrocarbon fuel fed to the fuel processor. Likewise, embodiments under the present invention utilizing the PBI PEM material do not require humidification of the PEM, and thus it is not necessary to humidify the cathode inlet stream, such that subsystems such as the enthalpy wheel 426 (FIG. 4) and the steam humidifier 518 (FIG. 5) can be eliminated.

One aspect of the present invention is the application of the concept that when the cathode exhaust is maintained at a stoich greater than 1 (e.g., 2 stoich), there is enough water vapor present to provide a desired ratio of the molar flow of water in the cathode exhaust to the molar flow of methane into the fuel processor to meet a given electric load. As an example, it may be preferable to keep this ratio over 2.0, such as in the range 2.0-5.0. Likewise, it will be appreciated that the cathode air stoich can be increased for a given electrical load to provide more oxygen to the fuel processor, since for a higher stoich, a lower percentage of the oxygen in the air will be reacted in the fuel cell.

For a given electrical demand, the fuel cell stack reacts enough air and fuel to meet the demand. Also corresponding to the given electrical demand, the fuel processor must produce enough reformate to support the amount of fuel required in the fuel cell stack to meet the electrical demand. It will be appreciated that in various embodiments of the present invention, the amount of water in the cathode exhaust at the given electrical demand is sufficient when added to the fuel processor to achieve an appropriate steam to carbon ratio (e.g., more than 2, or more than 2.5) with respect to the amount of hydrocarbon required by the fuel processor to meet the demand for reformate. In some cases, this may be true over the entire power output range of the system, and in other cases, this may not be true at certain operating points. In such cases, the fuel, air and steam may be supplemented or adjusted as needed.

While the forgoing discussion relates to embodiments designed to utilize natural gas (e.g., methane), it will be appreciated that embodiments under the present invention may also include system designed to utilize other hydrocarbon materials, such as propane, methanol, gasoline, etc.

Figure 6:
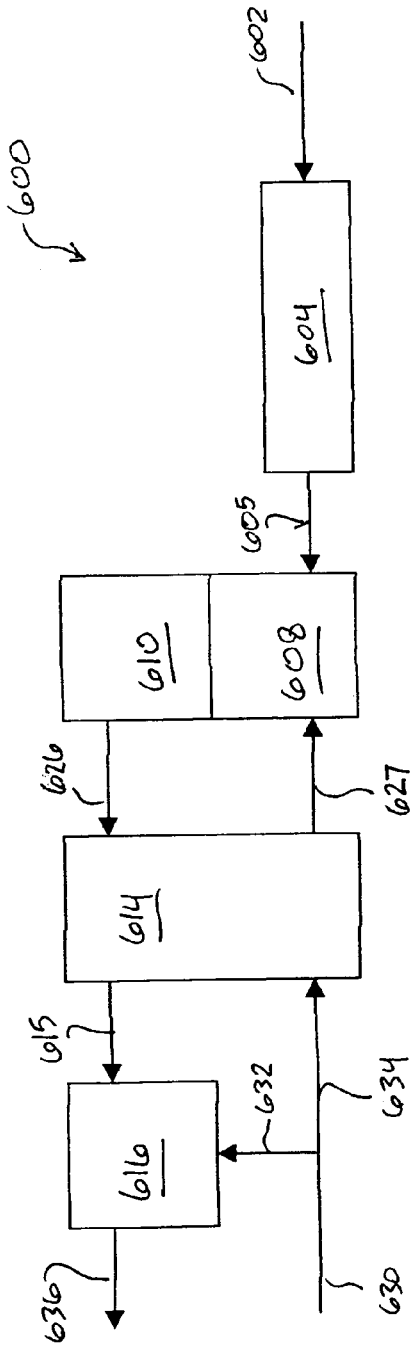
FIG. 6 shows a schematic diagram of an integrated high temperature PEM fuel cell system.

Referring to FIG. 6, a schematic diagram is shown of an integrated high temperature PEM fuel cell system 600 under one possible embodiment of the present invention. Natural gas enters the system via conduit 602 and is injected into a de-sulfurization vessel 604. The de-sulfurized natural gas is then injected via conduit 605 into an autothermal reactor 608. The reformate is then flowed through a shift reactor 610. The reformate is then flowed via conduit 626 through the anode chambers (not shown) of fuel cells in fuel cell stack 614. The anode exhaust is vented via conduit 615 to oxidizer 616. The oxidizer exhaust is vented to ambient via conduit 636. Air enters the system via conduit 630, and is supplied via conduit 632 to the oxidizer 616, and via 634 to the fuel cell stack 614. Unlike the prior art, the cathode exhaust is flowed via conduit 627 into the fuel mixture reacted in autothermal reactor 608. Under the present invention, cathode exhaust may be maintained at a temperature over 100° C. to prevent any condensation of water in the cathode exhaust. Likewise, the cathode exhaust plumbing may be insulated to prevent heat loss that might result in water loss through condensation.

Figure 7:
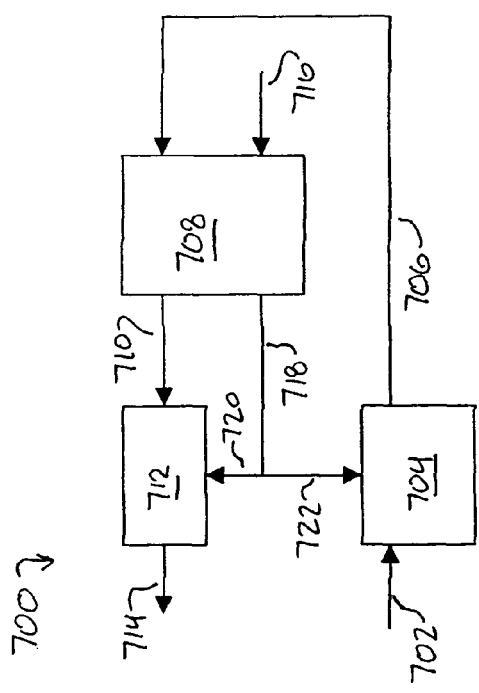
FIG. 7 shows a schematic diagram of an integrated high temperature PEM fuel cell system.

Referring to FIG. 7 a schematic diagram is shown of an integrated high temperature PEM fuel cell system 700 under the present invention. Natural gas enters the system via conduit 702 and is injected into a fuel processor 704. The reformate is flowed via conduit 706 to the anode chambers (not shown) of fuel cells in fuel cell stack 708. The anode exhaust is flowed via conduit 710 to oxidizer 712, which is vented to ambient via conduit 714. Air enters the system via conduit 716, and is flowed into the cathode chambers (not shown) of fuel cells in fuel cell stack 708. The cathode exhaust is flowed via conduit 718 to oxidizer 712, and via conduit 722 into the feed mixture fuel processor 704.

Figure 8:
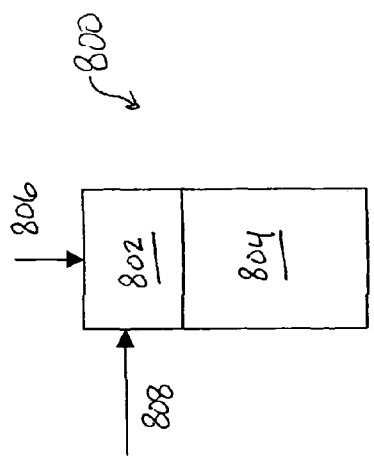
FIG. 8 shows a schematic diagram of a fuel processor.
Figure 9:
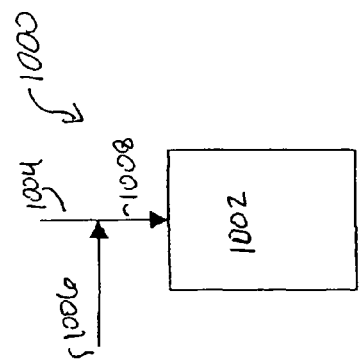
FIG. 9 shows a schematic diagram of a fuel processor.

Referring to FIG. 8, a schematic diagram is shown of a fuel processor 800. This diagram illustrates a mixing chamber 802 that receives a flow of cathode exhaust 806, and a flow of hydrocarbon gas 808 (e.g., methane). The cathode exhaust 806 and hydrocarbon gas 808 are thus mixed before flowing into reactor 804. Alternatively, referring to FIG. 9, a schematic diagram is shown of a fuel processor 1000 utilizing a reactor 1002 that receives a fuel air mixture via conduit 1008. Air is injected via conduit 1006 directly into fuel conduit 1004, which then flows to the reactor under the designation of conduit 1002.

Figure 10:
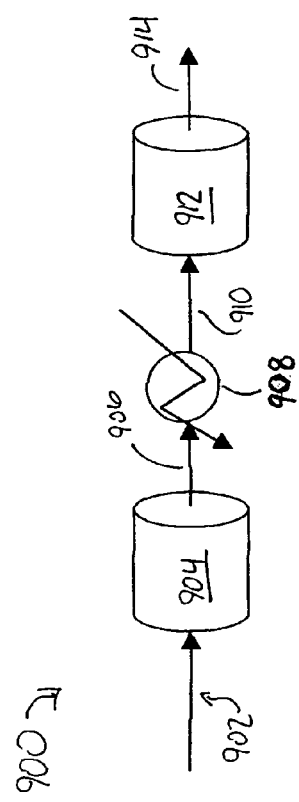
FIG. 10 shows a perspective drawing of various elements within a particular fuel processor.

Referring to FIG. 10, a perspective drawing is shown of various elements within a particular fuel processor. Hydrocarbon gas enters the system via conduit 902 and is flowed through an autothermal catalyst monolith 904. Catalyst monolith 904 can be, as an example, a ceramic honeycomb monolith that has been washed coated with platinum. The reformate 906 is exhausted from monolith 904 and passed across a heat transfer surface 908 which reduces the temperature of the reformate. The reduced temperature reformate 910 is flowed through a shift reaction catalyst monolith 912. Similar to monolith 904, catalyst monolith 912 can be, as an example, a ceramic honeycomb monolith that has been washed coated with platinum. The reformate then exits the fuel processor via conduit 914.

Figure 11:
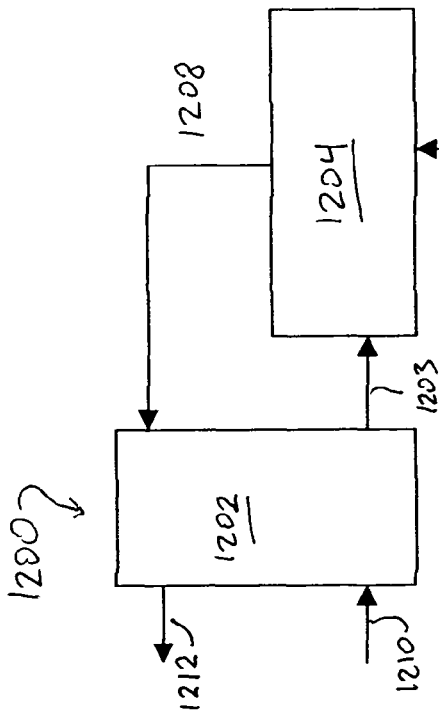
FIG. 11 shows a schematic diagram of an integrated high temperature PEM fuel cell system.

Referring to FIG. 11, a schematic diagram is shown of an integrated high temperature PEM fuel cell system 1100. In this case, a fuel processor 1104 is shown directly abutting a fuel cell stack assembly 1102. Hydrocarbon gas enters the system through conduit 1106 and reformate exits the fuel processor 1104 via conduit 1108. The reformate is flowed through fuel cell stack 1102 and exits the fuel cell stack 1102 via conduit 1112. Air enters the fuel cell stack 1102 via conduit 1110 and is exhausted directly into fuel processor 1104 due to its abutting connection to the stack 1102. In this manner, heat loss from the cathode exhaust is minimized along with any associated water loss from condensation.

Figure 12:
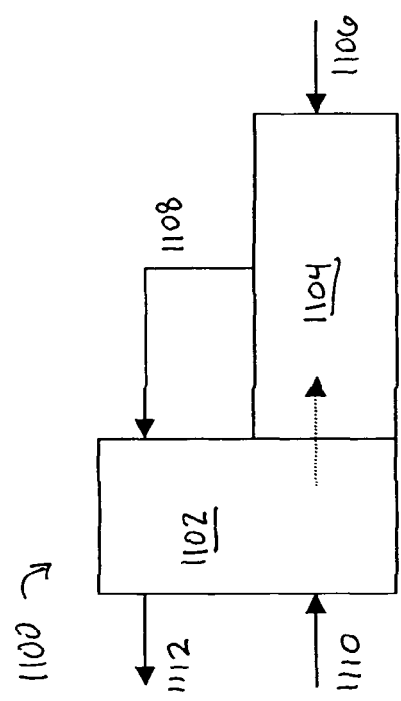
FIG. 12 shows a schematic diagram of an integrated high temperature PEM fuel cell system.

Referring to FIG. 12, a schematic diagram is shown of an integrated high temperature PEM fuel cell system. In this case, a fuel processor 1204 is shown connected to a fuel cell stack assembly 1202 via conduit 1203. Hydrocarbon gas enters the system through conduit 1206 and reformate exits the fuel processor 1204 via conduit 1208. The reformate is flowed through fuel cell stack 1202 and exits the fuel cell stack 1202 via conduit 1212. Air enters the fuel cell stack 1202 via conduit 1210 and is exhausted directly into fuel processor 1204 due to its abutting connection to the stack 1202. Cathode exhaust is flowed to fuel processor 1204 via conduit 1203. Conduit 1203 is insulated to minimize heat loss from the cathode exhaust along with any associated water loss from condensation.

Figure 13:
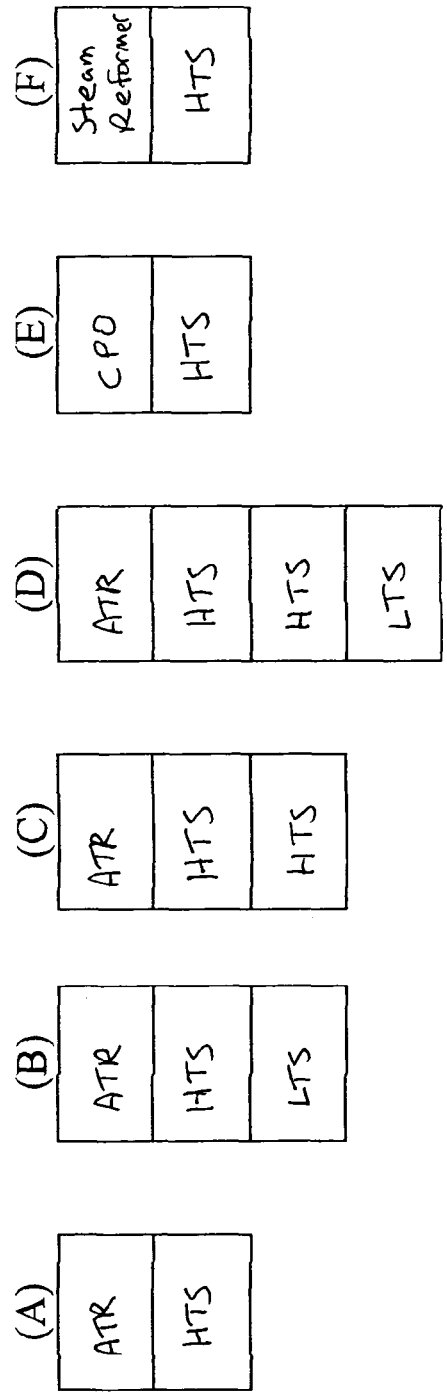
FIG. 13 shows a chart of possible fuel processor reactor configurations.

Referring to FIG. 13, a chart is shown of possible fuel processor reactor configurations under the present invention: (A) ATR with single stage HTS; (B) ATR with single stage HTS and single stage LTS; (C) ATR with double stage HTS; (D) ATR with double stage HTS and single stage LTS; (E) CPO with single stage HTS; and (F) steam reformer with single stage HTS. As will be appreciated by those of ordinary skill in the art, other reactor configurations are also possible.

In some embodiments, the autothermal and shift reactors may be sized and operated such that the reformate that is sent to the fuel cell contains 100-100,000 ppm carbon monoxide. Operation in the 100-200° C. temperature range allows the stack to tolerate carbon monoxide levels in this range without poisoning the fuel cell catalyst. Reducing the demands of the fuel processor for minimizing carbon monoxide production (e.g., needing to produce less CO than this range) enables a less expensive and simplified reformer design (e.g., less ATR and shift reactor catalysts, and no PROX require). In such systems, the spent fuel from the fuel cell stack can be sent to an oxidizer to reduce or eliminate residual hydrogen and hydrocarbons (e.g., reducing carbon monoxide to below 100 parts per million or some other desired range).

Under embodiments of the present invention, the catalyst in the fuel cell can be platinum-based, as is known in the art. Since the fuel cell stack is tolerant to carbon monoxide, an advantage of the invention is that it is not necessary to include a ruthenium-based catalyst or platinum ruthenium alloy to improve carbon monoxide tolerance, as is common in the prior art, and thus the cost associated with the fuel cell stack is reduced. Thus, some embodiments utilize a catalyst consisting essentially of platinum (platinum is the only catalytically active material in the catalyst layer of the fuel cell).

Embodiments of the invention may also include a controller adapted to achieve these objectives (e.g., microprocessor controlled blowers and valves that are responsive to the electrical load on the fuel cell stack, or on the performance condition of the fuel cell stack). Such a controller may include software or hardware programmed to manipulate system operating variables by controlling the operation of components within the system (see FIG. 3).

Also, the air supplied to the fuel cell stack may be preheated before it is introduced. As examples, the air may be preheated by passing it across a hot surface of the fuel processor such as the ATR vessel, or through a gas/gas heat exchanger associated with the reformate, or through a gas/liquid heat exchanger associated with a coolant system of the fuel cell stack or the fuel processor, or both.

Thus, in general, integrated fuel cell systems and associated operation methods have been discussed where water vapor in the cathode exhaust of a high temperature PEM fuel cell is used to provide steam utilized by a fuel processor providing hydrogen to the fuel cell.

In an embodiment of the invention, a fuel cell system includes a PEM fuel cell with an operating temperature of at least 120° C. The fuel cell has a cathode inlet and a cathode outlet. The system includes a cathode blower with an electrical connection to a controller, and the cathode blower is adapted to vary a flow of air through the fuel cell from the cathode inlet to the cathode outlet according to a first control signal from the controller.

The PEM used in the fuel cell stack can be based on the PBI membrane available from Celanese. U.S. patents describing this material include Nos. 5,525,436, 6,099,988, 5,599,639, and 6,124,060, which are each incorporated herein by reference. The term "high temperature PEM fuel cell" refers to a fuel cell that is operated at a temperature above 100° C., and that utilizes a polymer electrolyte membrane to support the fuel cell reaction. It should be noted that phosphoric acid, molten carbonate, alkaline and solid oxide fuel cell systems, which all operate at temperatures above 100° C., are not considered PEM systems since they do not utilize a polymer electrolyte membrane. Polybenzimidazole (PBI) and poly-ether ether ketone (PEEK) based fuel cell systems are considered high temperature PEM fuel cell systems, as examples. In some embodiments, the fuel cell stack can be operated at a temperature between 150-200° C. In still other embodiments, the fuel cell stack can be operated at a temperature between 160-180° C.

A fuel processing reactor has an inlet and an outlet, the inlet and outlet being in fluid communication with a catalyst suitable for converting a hydrocarbon into a gas containing hydrogen and carbon monoxide, and the outlet being in fluid communication with an anode chamber of the fuel cell. A fuel blower has an electrical connection to the controller, and the fuel blower is adapted to vary a flow of fuel through the reactor according to a second control signal form the controller. The cathode outlet is in fluid communication with the reactor inlet in order to provide water vapor to the reactor.

Various embodiments of the invention can include the following features, alone or in combination. The fuel cell can have an operating temperature in the range 160-200° C. The PEM of the fuel cell can comprise a polybenzimidazole material. The cathode blower can be adapted to flow ambient air directly through the fuel cell (i.e., the air is not humidified prior to entering the fuel cell). The controller can be adapted to modulate the first control signal to maintain a molar ratio of oxygen to methane in the reactor inlet, the ratio being in the range 0.4-0.7. The controller can also be adapted to modulate the second control signal to prevent hydrogen starvation in the fuel cell. It will be appreciated that hydrogen starvation refers to the condition when there is not enough hydrogen available to the fuel cell that can be reacted to provide the power demanded by a given electrical load. The controller can also be adapted to measure a voltage of the fuel cell stack and modulate the second control signal in response to the voltage measurement (e.g., if the voltage falls below a desired threshold indicating that additional hydrogen is needed to supply a given electrical load).

The system can further include a mixing vessel having a first inlet adapted to receive an air flow from the cathode outlet, a second inlet adapted to receive a fuel flow from the fuel blower, and an outlet adapted to flow a mixture of the air flow and fuel flow into the fuel processing reactor. The mixing vessel can further comprise a third inlet adapted to receive a flow of ambient air. The mixing vessel can further comprise a fourth inlet adapted to receive a flow of steam.

The carbon monoxide flowed from the fuel processing reactor to the fuel cell can have a concentration of at least 1,000 parts per million (e.g. 3,000-8,000 parts per million, or more). In another feature, as the cathode exhaust is flowed from the cathode outlet to the reactor inlet, the exhaust can be maintained at a temperature over 100° C. to keep the water in the exhaust in the vapor phase. In another feature, the cathode outlet can be connected to a conduit that is connected to the reactor inlet, where the conduit includes a by-pass vent so that a portion of the cathode exhaust can be selectively flowed to the fuel processor.

In another embodiment of the invention, a method of operating a fuel cell system includes the following: operating a first blower according to a first control signal to vary a flow of air through a cathode chamber of a fuel cell; reacting a portion of the air in the fuel cell to produce electricity; exhausting a remaining portion of the air from the fuel cell, wherein the remaining portion of air contains water vapor; mixing a portion of the exhausted air with a hydrocarbon gas to form a feed mixture; modulating the first control signal to maintain a predetermined amount of oxygen in the feed mixture; operating a second blower according to a second control signal to flow the feed mixture into a reactor where the feed mixture is contacted with a catalyst suitable for converting a portion of the hydrocarbon gas into a fuel gas containing hydrogen and carbon monoxide; flowing the fuel gas into an anode chamber of the fuel cell; and modulating the second control signal to maintain a predetermined amount of hydrogen in the fuel cell.

In addition, such embodiments may also contain methods of operating a fuel cell system, embodying any of the following steps and features, either alone or in combination. The operating temperature of the fuel cell can be maintained in the range 120-200° C. The fuel cell can comprise a polybenzimidazole PEM. The first blower can be adapted to flow ambient air directly through the fuel cell. The hydrocarbon gas can comprises methane, and the method further include modulating the first control signal to maintain a molar ratio of oxygen to methane in the reactor inlet, the ratio being in the range 0.4-0.7. Additional features may also include: flowing ambient air into the reactor (e.g., to provide additional oxygen); flowing steam into the reactor to maintain a molar ratio of water to methane in an atmosphere of the reactor, the ratio being in the range 2.0-5.0; or modulating the second control signal to prevent hydrogen starvation in the fuel cell. Some embodiments may include measuring a voltage of the fuel cell stack; and modulating the second control signal in response to the voltage measurement. Under the foregoing methods, the carbon monoxide in the fuel gas flowed into the anode chamber of the fuel cell can have a concentration of at least 1,000 parts per million (e.g., 3,000-10,000 parts per million).

In another embodiment of the invention, a method of operating a fuel cell system includes the following: operating a first blower according to a first control signal to vary a flow of ambient air through a cathode chamber of a fuel cell; reacting a portion of the air in the fuel cell to produce electricity; exhausting a remaining portion of the air from the fuel cell, wherein the remaining portion of air contains water vapor; mixing a portion of the exhausted air with methane to form a feed mixture; modulating the first control signal to maintain a molar ratio of oxygen to methane in the feed mixture, the ratio being in the range 0.4-0.7; operating a second blower according to a second control signal to flow the hydrocarbon gas into a reactor where the feed mixture is contacted with a catalyst suitable for converting a portion of the hydrocarbon gas into a fuel gas containing hydrogen and carbon monoxide; flowing the fuel gas into an anode chamber of the fuel cell; and modulating the second control signal to prevent hydrogen starvation in the fuel cell. Embodiments may further include any of the additional steps and feature described above, either alone or in combination.

While the invention has been disclosed with respect to a limited number of embodiments, those skilled in the art, having the benefit of this disclosure, will appreciate numerous modifications and variations therefrom. It is intended that the invention covers all such modifications and variations as fall within the true spirit and scope of the invention.

What is claimed is:
1. A method of operating a fuel cell system, comprising:
providing a flow of ambient air to a cathode chamber of a PEM fuel cell;
reacting a portion of the air in the fuel cell to produce electricity;
exhausting a remaining portion of the air from the fuel cell directly to a reactor assembly, wherein the remaining portion of air contains water vapor, wherein the fuel cell abuts the reactor assembly;
mixing at least a portion of the exhausted air with a hydrocarbon gas to form a feed mixture;
processing the feed mixture in the reactor assembly to generate a reformate flow;
routing the reformate flow from the reactor assembly to an anode chamber of the fuel cell;

regulating the remaining portion of the air from the fuel cell to cause the remaining portion of the air to contain a sufficient water content to provide a ratio of the molar flow of water in the remaining portion to the carbon molar flow of fuel into the reactor over 2.0; and maintaining an operating temperature of the fuel cell in the range 150-180° C.

2. The method of claim 1, further comprising maintaining production of electricity by the fuel cell without introducing water to either the path of the ambient air flow or to the path of the reformate flow from a water source external to the ambient air flow path and the reformate flow path and without introducing water directly to the fuel cell.

3. The method of claim 1, wherein the ratio of the molar flow of water to the carbon molar flow of fuel into the reactor is in the range of over 2.0 to 5.0.

* * * * *